United States Patent [19]

Kojima et al.

[11] Patent Number: 5,295,263
[45] Date of Patent: Mar. 15, 1994

[54] PROGRAMMABLE CONTROLLER WHICH ALLOWS CONTROL IN FORMATION TO BE UPDATED DURING EXECUTION

[75] Inventors: Kenji Kojima; Akio Toda, both of Hyogo, Japan

[73] Assignee: Mitsubishi Denki Kabushiki Kaisha, Tokyo, Japan

[21] Appl. No.: 823,965

[22] Filed: Jan. 22, 1992

[30] Foreign Application Priority Data

May 7, 1991 [JP] Japan .................................. 3-130250

[51] Int. Cl.$^5$ .............................................. G06F 9/00
[52] U.S. Cl. ................... 395/650; 364/DIG. 2; 364/926.9; 364/949; 364/947.4; 364/948.11; 364/975.2
[58] Field of Search ........................ 395/650, 700, 375; 364/900(DIG. 1), 200(DIG. 1)

[56] References Cited

U.S. PATENT DOCUMENTS

| | | | |
|---|---|---|---|
| 4,953,082 | 8/1990 | Nomura et al. | 364/200 |
| 4,972,365 | 11/1990 | Dodds et al. | 364/900 |
| 5,027,316 | 6/1991 | Frantz et al. | 364/900 |
| 5,093,804 | 3/1992 | Cieri et al. | 395/275 |
| 5,099,418 | 3/1992 | Pian et al. | 395/650 |
| 5,103,391 | 4/1992 | Barrett | 364/133 |

Primary Examiner—Kevin A. Kriess
Attorney, Agent, or Firm—Rothwell, Figg, Ernst & Kurz

[57] ABSTRACT

A programmable controller having a loading feature for changing such control information as control programs. The controller comprises a load execution unit and an allocation unit. The load execution unit checks, upon receipt of new control information, the execution state of the program to be changed based on management information stored in a management table. The load execution unit loads the new control information into an area indicated by addresses held in a management table if the program is in non-executing or non-executable state. The load execution unit loads the new control information into a reserved area indicated by addresses held in a reserved table if the program is in executing or executable state. The allocation unit replaces the content of the addresses held in the management table with the content of the addresses held in the reserved table after the load execution unit has loaded the new control information into the reserved area.

6 Claims, 8 Drawing Sheets

| PROGRAM ID | MANAGEMENT INFORMATION | START ADDRESS LIST ||| 
| | | CONTROL PROGRAM | CONTROL DATA | START MANAGEMENT TABLE |
|---|---|---|---|---|
| A | EXECUTING | 1000 | 2000 | 800 |
| B | EXECUTABLE | 1100 | 2100 | 820 |
| C | EXECUTING | 1200 | 2200 | 840 |
| D | STOPPED | 1300 | 2300 | 860 |
| E | UNDEFINED | 1400 | 2400 | 880 |

FIG. 5 (PRIOR ART)

| EXECUTION CYCLE |
|---|
| PRE-EXECUTION PROGRAM ID |
| PRE-EXECUTION PROGRAM ID |

| TEMPORARY ID | CORRESPONDING PROGRAM ID | START ADDRESS LIST | | |
|---|---|---|---|---|
| | | CONTROL PROGRAM | CONTROL DATA | START MANAGEMENT TABLE |
| F | A | 1500 | 2500 | 900 |
| G | BLANK | 1600 | 2600 | 920 |

3d

PROGRAMMABLE CONTROLLER WHICH ALLOWS CONTROL INFORMATION TO BE UPDATED DURING EXECUTION

BACKGROUND OF THE INVENTION

1. Field of the Invention

The present invention relates to a programmable controller having a loading feature that changes control information such as control programs.

2. Description of the Prior Art

Figure 1:
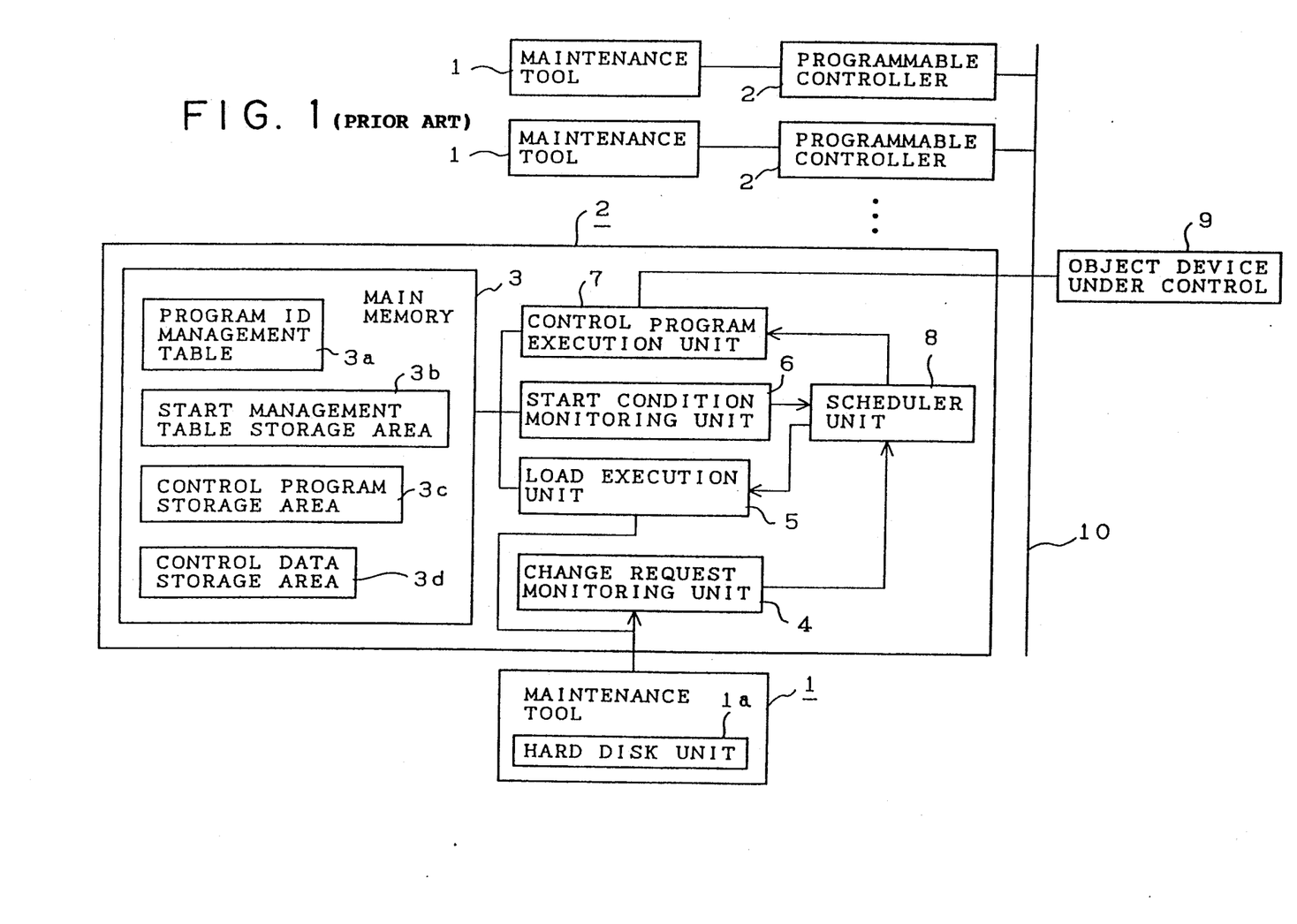
FIG. 1 is a block diagram of a typical prior art programmable controller.

FIG. 1 is a block diagram of the conventional programmable controller disclosed in Japanese Patent Application Laid-Open No. 2-125360. In FIG. 1, reference numeral 1 designates a maintenance tool used to develop and maintain control information such as control programs, control data and a start management table necessary for executing a programmable controller 2; and numeral 1a designates a hard disk unit that contains the control information. Each programmable controller 2 has a main memory 3 which in turn comprises a program ID management table 3a, a start management table storage area 3b, a control program storage area 3c and a control data storage area 3d. The program ID management table 3a stores management information about the state of control program execution as well as the addresses of the areas holding the control information, i.e., addresses of the start management table storage area 3b, the control program storage area 3c and the control data storage area 3d. The start management table storage area 3b stores conditions for starting control programs. The control program storage area 3c stores the control programs. The control data storage area 3d stores the control data for the control programs. Also in FIG. 1, numeral 4 designates a change request monitoring unit that checks to see if any new control information is output from the maintenance tool 1 and, if such new control information is received, notifies a scheduler unit 8 thereof. Numeral 5 designates a load execution unit that accepts new control information from the maintenance tool 1 and, upon receipt of an execution command from the scheduler unit 8, loads the new control information into the area designated by the addresses stored in the program ID management table 3a. Numeral 6 designates a start condition monitoring unit that searches for an executable control program based on the management information stored in the program ID management table 3a, checks the start management table storage area 3b for the condition for starting the executable control program, and supplies the scheduler unit 8 with a program start command to start that program if the condition for starting it has been met. Numeral 7 designates a control program execution unit that executes the control program when receiving the start command therefor from the scheduler unit 8. Numeral 8 designates the scheduler unit that controls the load execution unit 5 and control program execution unit 7. Numeral 9 designates an object device to be controlled by the control program execution unit 7. Numeral 10 designates a system bus that connects a plurality of programmable controllers 2.

Figure 2:
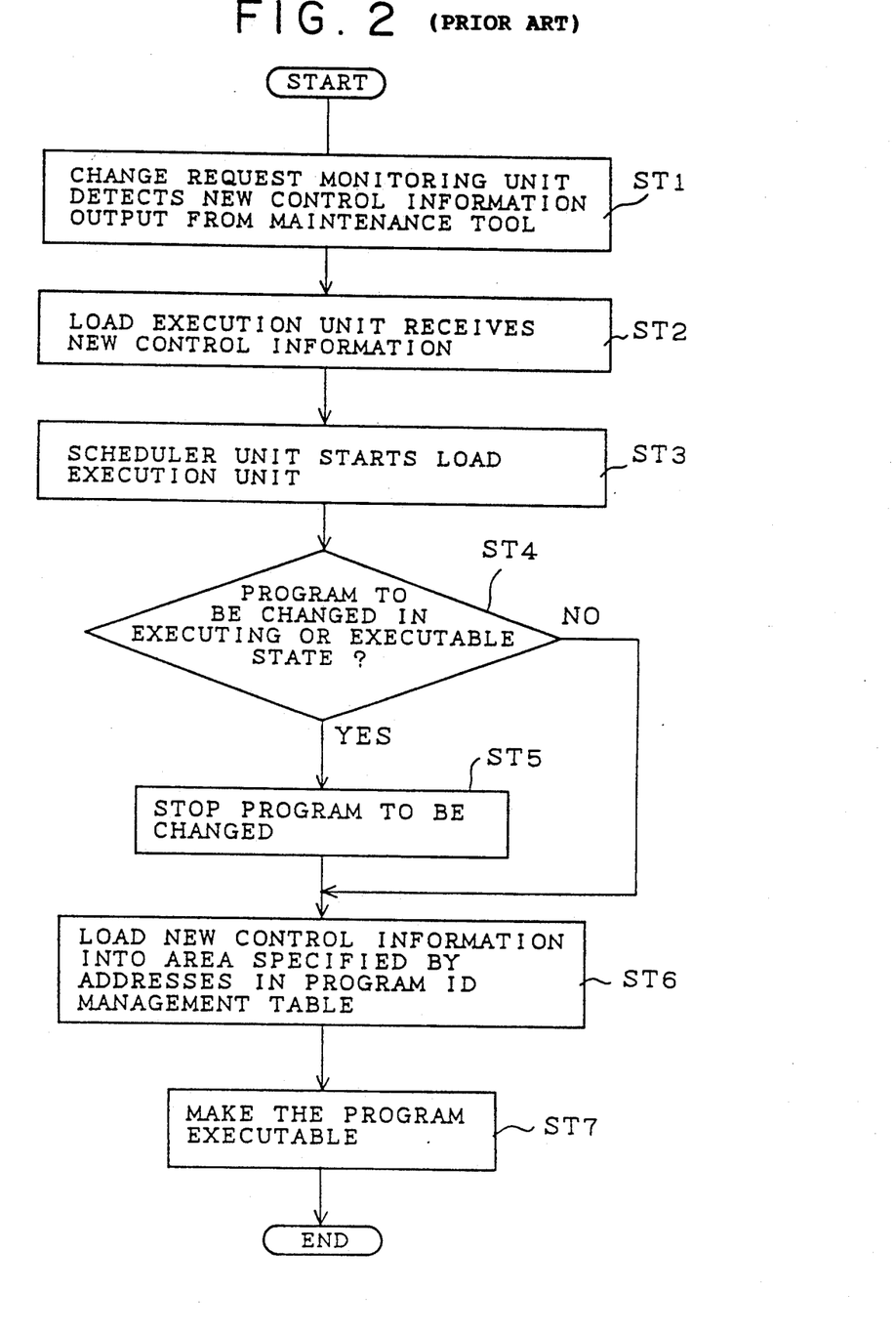
FIG. 2 is a flowchart describing how the programmable controller of FIG. 1 works.

How each programmable controller of FIG. 1 works will now be described with reference to the flowchart of FIG. 2. In step ST1, the change request monitoring unit detects new control information from the maintenance tool 1. In step ST2, the change request monitoring unit 4 notifies the scheduler 8 of the detection of the new control information, and the load execution unit 5 accepts that information. In step ST3, the scheduler unit 8 starts the load execution unit 5 by carrying out a scheduling procedure, to be described later with reference to FIG. 3. In step ST4, the load execution unit 5 checks to see if the control program to be changed is executing or executable in accordance with the management information in the program ID management table 3a. If the control program to be changed is found to be executing or executable (see program ID's "A" through "C" in FIG. 4), step ST5 is reached. In step ST5, the control program in question is stopped by rewriting into stopped state the content of the management information in the program ID management table 3a. In step ST6, the load execution unit 5 loads the new control information into the area indicated by the addresses placed in the program ID management table (e.g., addresses pointing to control program 1000, control data 2000 and start management table 800 if the program to be changed is A). In step ST7, the content of the management information is rendered executable. This completes the whole controller operation.

Figure 3:
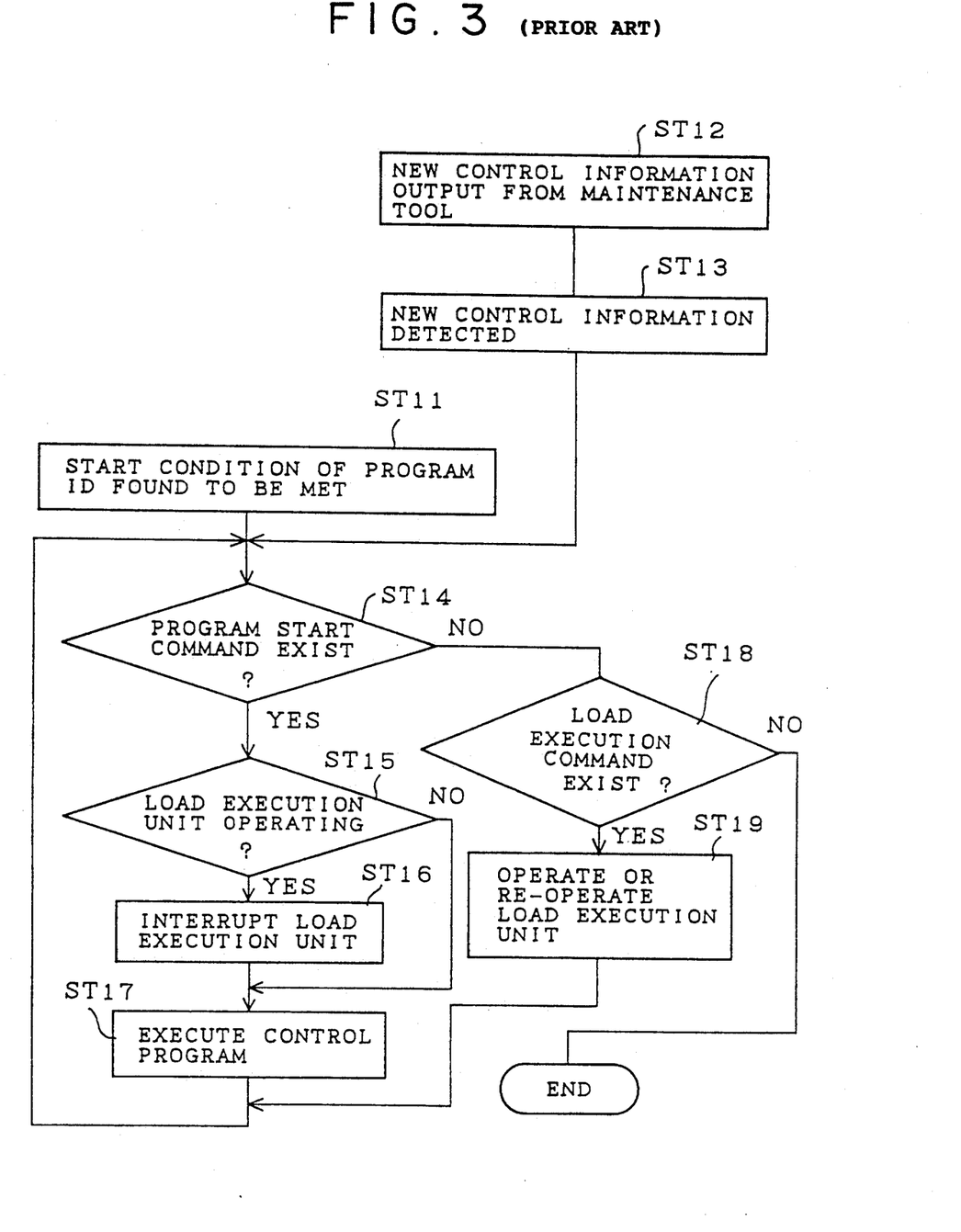
FIG. 3 is a flowchart depicting how a scheduler unit of the same programmable controller works.

How the scheduler unit 8 performs its scheduling will now be described with reference to the flowchart of FIG. 3. In step ST11, the start condition monitoring unit 6 checks the start management table 3b for the condition for starting the executable control program and, every time the applicable starting condition is met, outputs a control program start command to the scheduler unit 8. In step ST12, the maintenance tool 1 outputs new control information. In turn, after detecting this new control information (step ST13), the change request monitoring unit 4 outputs a load execution unit start command to the scheduler unit 8. In step ST14, the scheduler unit 8 checks to see if it has received a control program start command from the start condition monitoring unit 6. If it has, the scheduler unit 8 goes to step ST15 and checks to see if the load execution unit 5 is operating. If the load execution unit 5 is found to be operating, step ST16 is reached in which the load execution unit 5 is stopped. In step ST17, the control program execution unit 7 is executed. If it is found in step ST14 that the scheduler unit 8 has not received a control program start command from the start condition monitoring unit 6, step ST18 is reached In step ST18, a check is made to see if the load execution unit 5 has received a load execution instruction. If the load execution unit 5 is found to have received such instruction in step ST18, step ST19 is reached in which the unit 5 is operated or re-operated after interruption. That is, the scheduler unit while performing its scheduling executes the control program execution unit 7 in precedence over the load execution unit 5.

Figure 4:
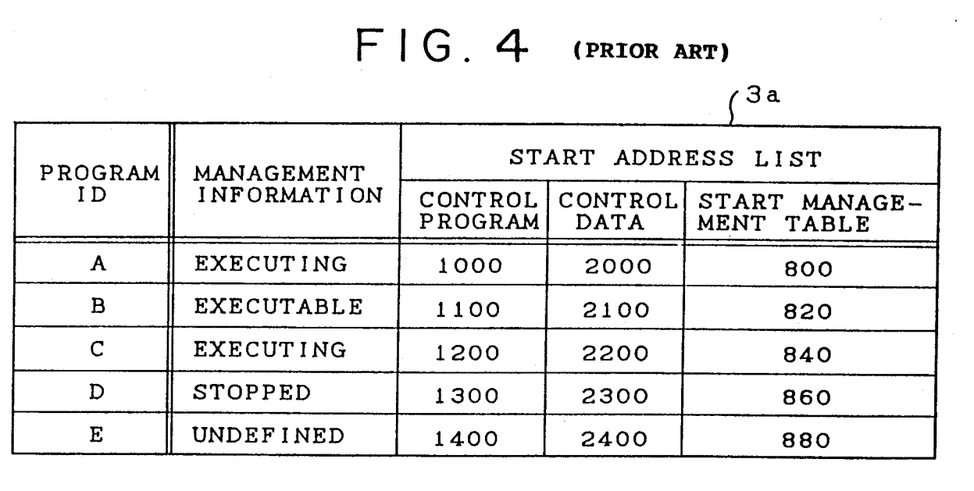
FIG. 4 is a view showing a typical structure of an ID management table for use with the same programmable controller.

FIG. 4 is a typical structure of the program ID management table 3a. In FIG. 4, the program ID management table 3a illustratively contains, and not limited to, five program ID's. One program ID is composed of program ID execution state (management information) and a start address list. The execution state is any of "executing," "executable," "stopped" and "undefined." One start address list illustratively comprises a control program start address, a control data start address and a start management table start address. Initially, the execution state is "undefined" and the start address list has appropriate start addresses already set thereto.

Figure 5:
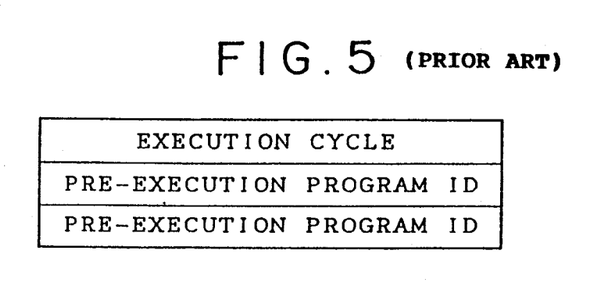
FIG. 5 is a view illustrating a typical structure of a start management table assigned to each program ID for use with the same programmable controller.

FIG. 5 is a typical structure of the start management table 3b allocated to each program ID. A start management table illustratively contains a start cycle and pre-execution program ID's. A start cycle designates time intervals at which to start the applicable control program. A pre-execution program ID specifies that the applicable control program is to be started when execution of a certain program is completed.

The prior art programmable controller of the above-described construction is required to stop the currently executing or executable control program when a request is made to replace the current control information with new information. In particular, the prior art programmable controller requires the object device under its control to be stopped while the information is being replaced.

SUMMARY OF THE INVENTION

It is therefore an object of the present invention to overcome the above-described drawbacks and disadvantages and to provide a programmable controller capable of replacing the current control information with new control information without stopping the object device under control when a request is made to carry out such information replacement.

In carrying out the invention and according to one aspect thereof, there is provided a programmable controller comprising a load execution unit and an allocation unit. The load execution unit checks, upon receipt of new control information, the execution state of the program to be changed based on management information stored in a management table. The load execution unit loads the new control information into an area indicated by addresses held in the management table if the program is in non-executing or non-executable state. The load execution unit loads the new control information into a reserved area indicated by addresses held in a reserved table if the program is in executing or executable state. The allocation unit rewrites the content of the addresses held in the management table so that the addresses will coincide with the content of the addresses held in the reserved table after the load execution unit has loaded the new control information into the reserved area.

In other words, once the load execution unit places the new control information into the reserved area, the allocation unit replaces the content of the addresses held in the management table with the content of the addresses held in the reserved table so that the new control information will replace the old without interruption of program execution.

Further objects, features and advantages of the present invention will become more apparent upon a reading of the following description and appended drawings. It is to be noted that the drawings are for illustrative purposes only and are not limitative of the invention.

DETAILED DESCRIPTION OF THE PREFERRED EMBODIMENTS

Figure 6:
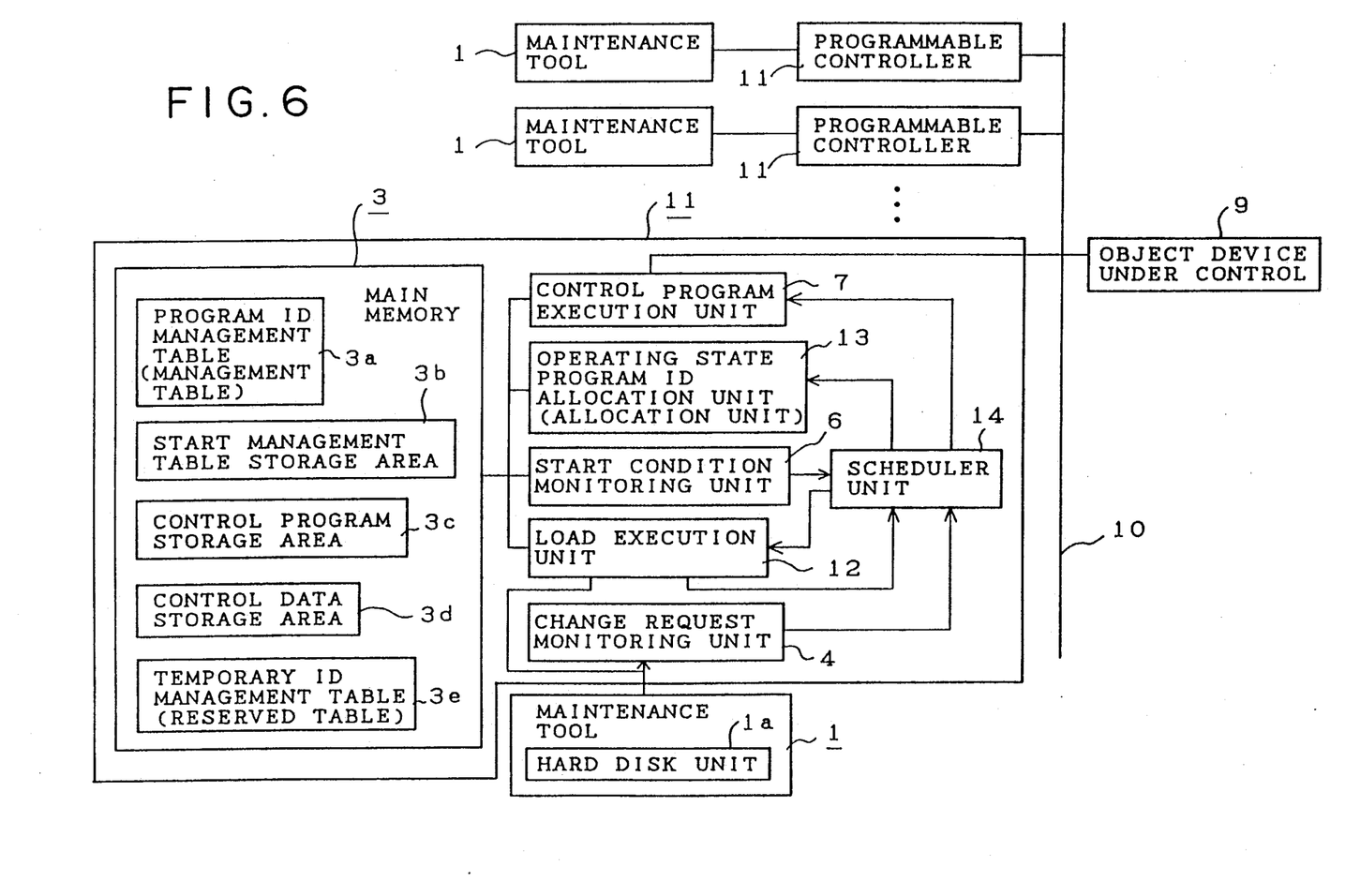
FIG. 6 is a block diagram of a programmable controller practiced as one preferred embodiment of the present invention.

One preferred embodiment of the present invention will now be described with reference to the accompanying drawings. FIG. 6 is a block diagram showing the programmable controller illustratively embodying the invention. Those parts in FIG. 6 which are functionally identical to those already described in connection with the prior art example are designated by the same reference numerals, and any repetitive description thereof is omitted.

In FIG. 6, reference numeral 3e designates a temporary ID management table (reserved table) which is allocated to an area different from that designated by addresses held in the program ID management table 3a; the temporary ID management table 3e accommodates the addresses identifying a reserved area into which to store new control information replacing the old. Numeral 11 designates a programmable controller. Numeral 12 designates a load execution unit that receives new control information from the maintenance tool 1 and, based on the management information held in the program ID management table 3a, checks the state of the program to be changed. If the program in question is in non-executing or non-executable state, the load execution unit 12 loads the new control information into the area specified by the addresses held in the program ID management table 3a. If the program is in executing or executable state, the load execution unit 12 loads the new control information into the reserved area designated by the addresses held in the temporary ID management table 3e. Numeral 13 designates an operating state program ID allocation unit (allocation unit) that rewrites the content of the addresses held in the program ID management table 3a using the content of the addresses held in the temporary ID management table 3e after the load execution unit 12 has loaded the new control information into the reserved area. Numeral 14 designates a scheduler unit that controls the control program execution unit 7, the load execution unit 12 and the operating state program ID allocation unit 13.

Figure 7:
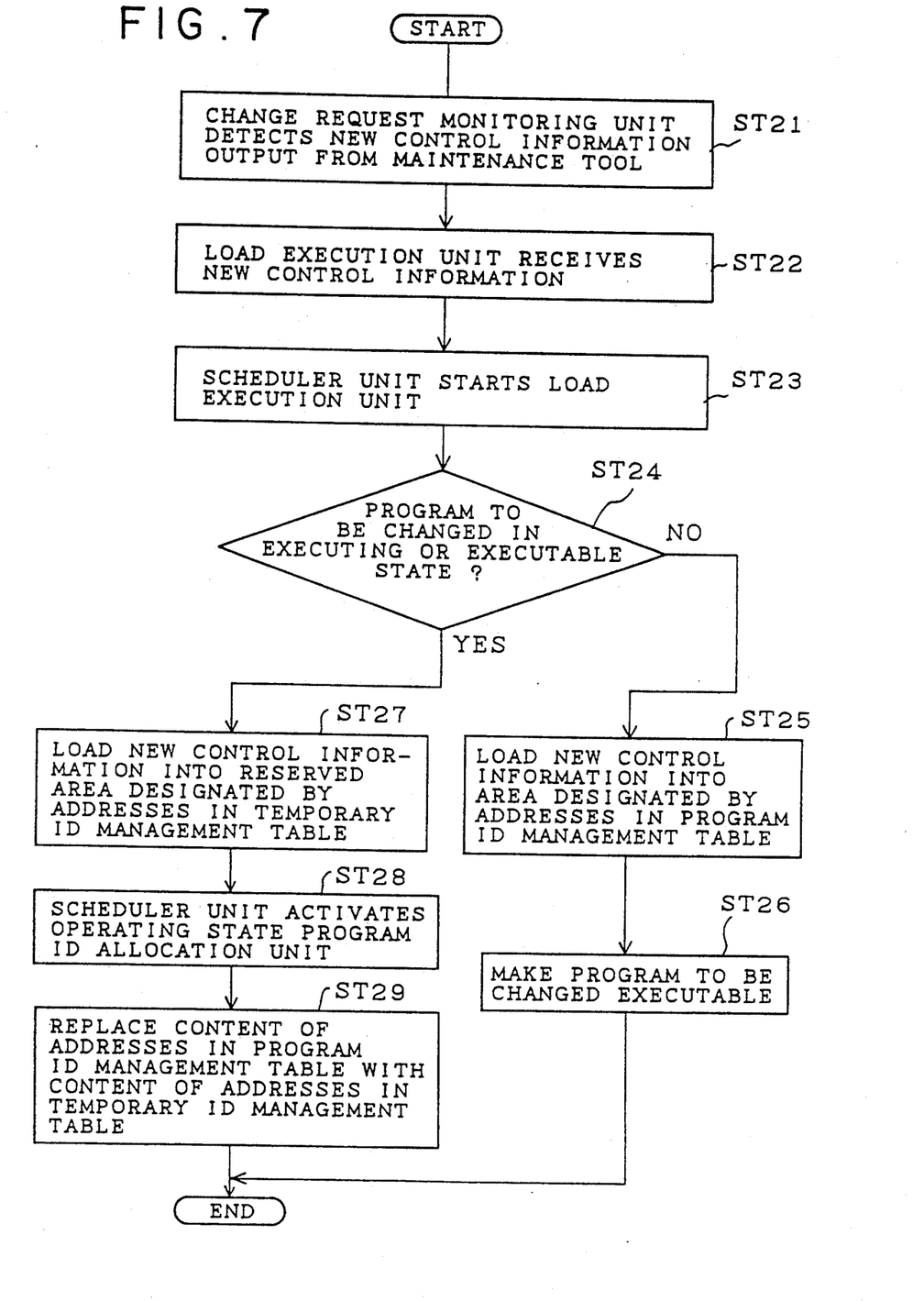
FIG. 7 is a flowchart describing how the programmable controller of FIG. 6 works.

How the programmable controller of FIG. 6 works will now be described with reference to FIG. 7. When the maintenance tool 1 outputs new control information, the change request monitoring unit 4 detects the occurrence of the information in step ST21. In step ST22, the change request monitoring unit 4 notifies the scheduler unit 14 of the detection and the load execution unit 12 receives the new control information.

In step ST23, the scheduler unit 14 performs its scheduling (to be described later with reference to FIG. 8) to get the load execution unit 12 started. In step ST24, the load execution unit 12 checks to see if the control program to be changed is in executing or executable state on the basis of the management state of the program ID management table 3a. If the program to be changed is not in executing or executable state (see program ID "D" in FIG. 4), step ST25 is reached. In step ST25, the load execution unit 12 loads the new control information into the area designated by the addresses held in the program ID management table 3a. (Illustratively, the area is one designated by control program address 1300, control data address 2300 and start management table address 860 for the program D). Step ST25 is followed by step ST26 in which the content of the management information is put into executable state. This completes the processing.

Figure 9:
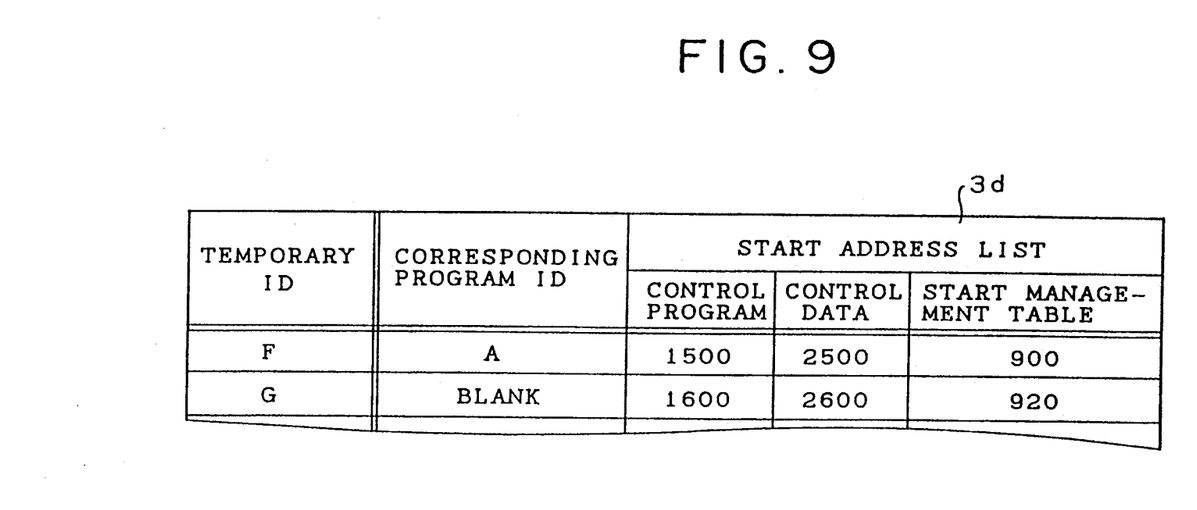
FIG. 9 is a view illustrating a reserved table for use with the programmable controller of FIG. 6.

If, in step ST24, the program to be changed is found to be in executing or executable state, step ST27 is reached (see program ID's "A", "B" and "C" in FIG. 4; assume here that the program to be changed is B). In step ST27, the load execution unit 12 loads the new control information into the area designated by the addresses held in the temporary ID management table 3e. (In this example, there are two reserved areas as shown in FIG. 9. Since temporary ID "F" is already in use and temporary ID "G" is blank, the area indicated by temporary ID "G", i.e., area identified by control program address 1600, control data address 2600 and start management table 920 is applicable here.) When the loading is completed, the load execution unit 12 notifies the scheduler unit 14 thereof.

Upon receipt of a load complete report from the load execution unit 12, the scheduler unit 14 enters step ST28 and issues a start command to the operating state program ID allocation unit 13. Step ST28 is followed by step ST29 in which the operating state program ID allocation unit 13 replaces the content of the addresses (of program ID "B") held in the program ID management table 3a with the content of the addresses (of temporary ID "G") held in the temporary ID management table 3e. That is, of the addresses of program ID "B" held in the program ID management table 3a, control program address 1100 is changed into 1600, control data address 2100 into 2600, and start management table address 820 into 920.

Following the above address change, the operating state program ID allocation unit 13 clears the state of the temporary ID management table 3e in preparation for next processing.

With the new control information placed in the area designated by the addresses in the program ID management table 3a, the control program execution unit 7 carries out its operation in accordance therewith.

Figure 8:
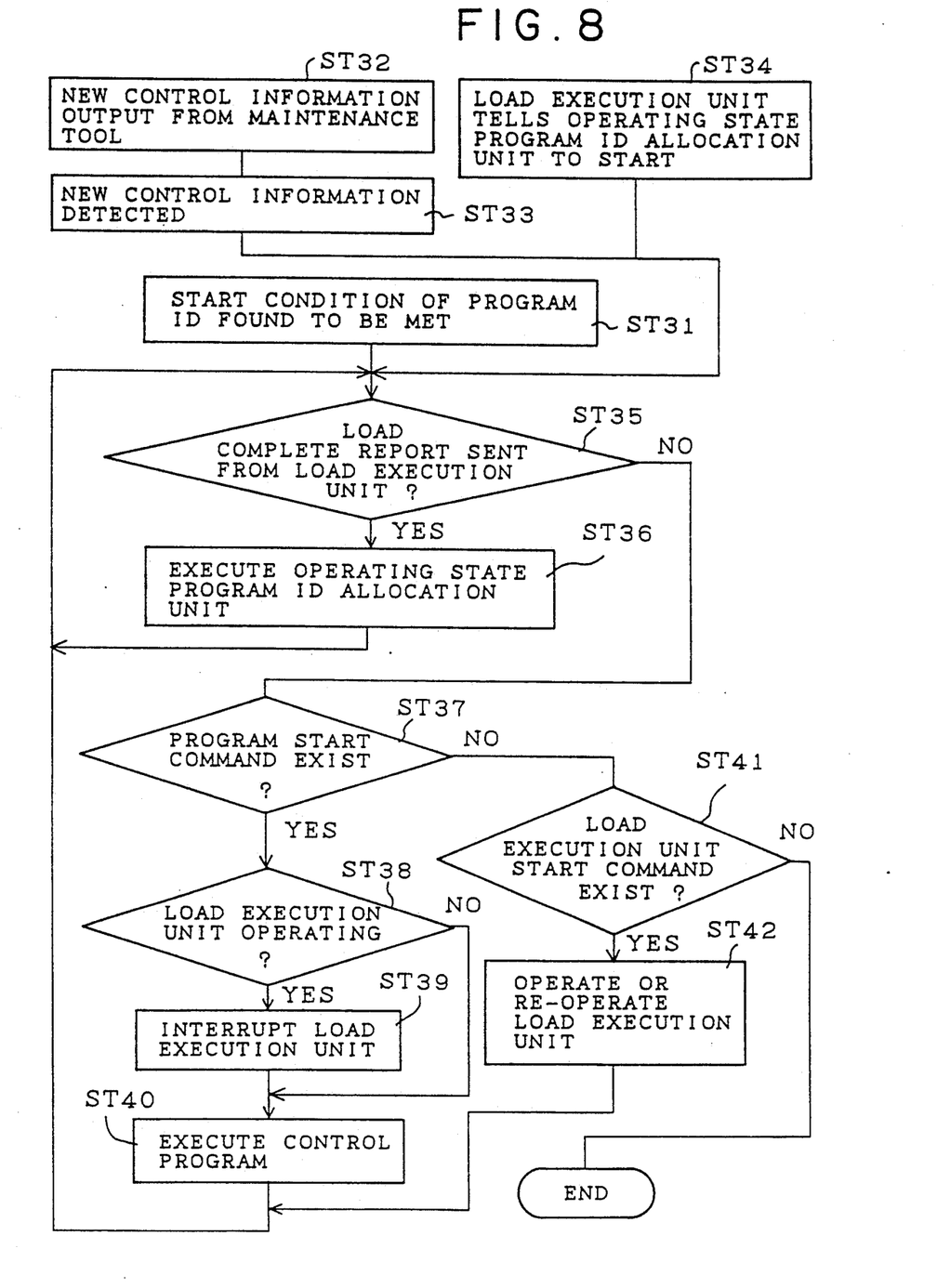
FIG. 8 is a flowchart depicting how a scheduler unit of the programmable controller in FIG. 6 works.

How the scheduler unit 14 performs its scheduling will now be described with reference to FIG. 8. The start condition monitoring unit 6 monitors the executable control program as to whether or not the applicable start condition held in the start management table 3b is met. Every time such start condition is met, step ST31 is entered in which the start condition monitoring unit 6 outputs a control program start command to the scheduler unit 14. If new control information is output by the maintenance tool 1 in step ST32, the change request monitoring unit 4 enters step ST33 and outputs a load execution unit start command to the scheduler unit 14. In step ST35, the scheduler unit 14 checks to see if a load complete report has been sent from the load execution unit 12. If the load complete report has been received, step ST36 is reached in which the operating state program ID allocation unit 13 is operated.

If no load complete report is found in step ST35, step ST37 is reached. In step ST37, the start condition monitoring unit 6 checks to see if a control program start command exists. If such command is found to exist, step ST38 is reached in which a check is made to see if the load execution unit 12 is operating. If it is, the load execution unit 12 is interrupted in step ST39. In step ST40, the control program execution unit 7 is operated. If no control program start command is found in step ST37, step ST41 is reached. In step ST41, a check is made to see if a load execution unit start command exists. If such command is found to exist, step ST42 is reached in which the load execution unit 12 is operated or reoperated after interruption.

That is, the scheduler unit 14 performs its scheduling in such a manner that the operating state program ID allocation unit 13 is operated in precedence over the control program execution unit 7 which in turn is operated in precedence over the load execution unit 12.

As described, the load execution unit 12 loads new control information into a reserved area only when the control program is in executable state (not currently executing but ready to execute at any time, such as in sleep state). Immediately after the loading, the operating state program ID allocation unit 13 is started.

With the above-described embodiment, control information is held in the main memory 3. Alternatively, control information may be stored in a shared memory connected to the system bus 10.

In the above-described construction, the maintenance tool 1 is connected direct to the programmable controller. Alternatively, the maintenance tool 1 may be connected to the system bus 10.

The above embodiment is so constructed as to have control information retained in the hard disk unit 1a (auxiliary memory) within the maintenance tool 1. Alternatively, control information may be held in an auxiliary memory under control of an I/O device connected direct to the programmable controller or to the system bus 10 thereof. In this setup, the I/O device loads the information into the programmable controller.

As described, the invention has its load execution unit load new control information into the reserved area. Thereafter, the allocation unit of the invention replaces the content of the addresses held in the management table with the content of the addresses held in the reserved table. This feature allows the currently executing program to go on executing while the old control information is being replaced with the new. As a result, the object device under control need not be stopped every time control information is changed.

As many apparently different embodiments of the current invention may be made without departing from the spirit and scope thereof, it is to be understood that the invention is not limited to the specific embodiments thereof except as defined in the appended claims.

What is claimed is:

1. A programmable controller comprising:
   a management table for storing addresses designating an area for accommodating management information about execution states of programs and such control information as data and programs necessary for executing said programs;
   a reserved table for storing addresses designating a reserved area so allocated as to differ from the area for accommodating said control information, said reserved area accommodating new control information intended to replace said control information;
   a load execution unit for checking, upon receipt of said new control information, the execution state of a program to be changed based on management information held in said management table; said load execution unit loading said new control information into an area designated by addresses held in said management table if said program to be changed is in non-executing or non-executable state; said load execution unit loading said new control information into a reserved area designated by addresses held in said reserved table if said program to be changed is in executing or executable state; and an allocation unit for replacing the content of the addresses held in said management table with the content of the addresses held in said reserved table after said load execution unit has loaded said new control information into said reserved area.

2. A programmable controller according to claim 1, further comprising a shared memory connected to a system bus to which a plurality of said programmable controllers may be attached, said shared memory accommodating said control information.

3. A programmable controller according to claim 1, further comprising a maintenance tool connected to a system bus to which a plurality of said programmable controllers may be attached, said maintenance tool serving to develop and maintain said control information.

4. A programmable controller according to claim 2, further comprising a maintenance tool connected to said system bus, said maintenance tool serving to develop and maintain said control information.

5. A programmable controller according to claim 1, further comprising an auxiliary memory under control of an input/output device connected to said programmable controller, said input/output device storing said control information into said auxiliary memory and loading said control information therefrom into said programmable controller.

6. A programmable controller according to claim 1, further comprising an auxiliary memory under control of an input/output device connected to a system bus to which a plurality of said programmable controllers may be connected, said auxiliary memory accommodating said control information, said input/output device loading said control information from said auxiliary memory to any of said plurality of programmable controllers.

* * * * *